United States Patent
Stack

(10) Patent No.: US 8,008,865 B2
(45) Date of Patent: Aug. 30, 2011

(54) MULTIPLE FAILURE DETECTION SHUTDOWN PROTECTION CIRCUIT FOR AN ELECTRONIC BALLAST

(76) Inventor: Thomas E Stack, Oxford, MI (US)

( * ) Notice: Subject to any disclaimer, the term of this patent is extended or adjusted under 35 U.S.C. 154(b) by 460 days.

(21) Appl. No.: 12/214,982

(22) Filed: Jun. 25, 2008

(65) Prior Publication Data

US 2011/0101866 A1    May 5, 2011

Related U.S. Application Data

(63) Continuation of application No. 11/105,091, filed on Apr. 13, 2005, now Pat. No. 7,598,677, which is a continuation-in-part of application No. 10/649,885, filed on Aug. 26, 2003, now Pat. No. 7,405,522, application No. 12/214,982, which is a continuation-in-part of application No. 10/649,885.

(51) Int. Cl.
*H05B 37/00* (2006.01)

(52) U.S. Cl. ............. 315/127; 315/209 R; 315/224; 315/307; 315/291; 315/DIG. 4; 315/DIG. 7

(58) Field of Classification Search ............ 315/112, 315/119, 127, 224, 225, 247, 244, 9 R, 276, 315/291, 307, DIG. 4, DIG. 5, DIG. 7; 363/34, 363/37, 53, 56
See application file for complete search history.

(56) References Cited

U.S. PATENT DOCUMENTS

| | | | | |
|---|---|---|---|---|
| 3,699,382 A * | 10/1972 | Franke | | 315/92 |
| 4,382,212 A * | 5/1983 | Bay | | 315/225 |
| 4,523,131 A * | 6/1985 | Zansky | | 315/307 |
| 4,535,399 A * | 8/1985 | Szepesi | | 363/41 |
| 4,554,487 A * | 11/1985 | Nilssen | | 315/224 |
| 4,667,131 A * | 5/1987 | Nilssen | | 315/275 |
| 5,451,845 A * | 9/1995 | Ribarich | | 315/225 |
| 5,475,284 A * | 12/1995 | Lester et al. | | 315/209 R |
| 5,574,335 A * | 11/1996 | Sun | | 315/119 |
| 5,619,105 A * | 4/1997 | Holmquest | | 315/225 |
| 5,636,111 A * | 6/1997 | Griffin et al. | | 363/37 |
| 5,650,694 A * | 7/1997 | Jayaraman et al. | | 315/225 |
| 5,789,870 A * | 8/1998 | Remson | | 315/194 |
| 5,834,903 A * | 11/1998 | Christian | | 315/219 |
| 5,889,370 A * | 3/1999 | Arai et al. | | 315/85 |
| 5,930,126 A * | 7/1999 | Griffin et al. | | 363/37 |

(Continued)

*Primary Examiner* — Haissa Philogene

(57) ABSTRACT

A shut-down circuit configured for use with an electronic ballast coupled to a lamp in a control path includes a device for sensing the electrical energy associated with the control path, and a sensing circuit for shutting down the ballast in the event that the energy does not conform to a predetermined condition. The sensed energy may be current indicative of lamp installation or short circuit, or voltage indicative of arcing or open circuit. The device for sensing the electrical energy associated with the control path may be an isolation transformer, or alternative devices such as optical isolators may be employed. The circuitry may further include electronic componentry to disable the sensing circuit during initial energization of the lamp. In one disclosed example, the sensing circuit includes a node that should be at or near a predetermined electrical potential when the lamp is operating properly, and a switch such as a Schmitt trigger coupled to the node that turns on or off to shut down the ballast if the node is not at or near the predetermined electrical potential. In an implementation used to detect voltage fluctuations indicative of arcing, the circuitry may include a high-pass filter or differentiator and detector to detect high-frequency noise. Alternatively, a phase-locked loop may be coupled to a low-pass filter to detect high-frequency noise indicative of arcing. In another alternative implementation, a microprocessor performing a digital signal processing algorithm may determine the presence of an abnormal condition.

14 Claims, 6 Drawing Sheets

U.S. PATENT DOCUMENTS

| | | | |
|---|---|---|---|
| 6,008,592 A * | 12/1999 | Ribarich | 315/225 |
| 6,198,226 B1 * | 3/2001 | Koskuba, Jr. | 315/169.3 |
| 6,222,322 B1 * | 4/2001 | Stack | 315/119 |
| 6,292,339 B1 * | 9/2001 | Brooks | 361/78 |
| 6,331,755 B1 * | 12/2001 | Ribarich et al. | 315/225 |
| 6,420,838 B1 * | 7/2002 | Shackle | 315/224 |
| 6,504,318 B1 * | 1/2003 | Pienisaari | 315/242 |
| 6,525,492 B2 * | 2/2003 | Ribarich | 315/291 |
| 6,541,923 B1 * | 4/2003 | Tyson | 315/224 |
| 6,781,326 B2 * | 8/2004 | Stack | 315/291 |
| 6,809,483 B2 * | 10/2004 | Alexandrov | 315/224 |
| 7,405,522 B2 * | 7/2008 | Stack | 315/127 |
| 7,598,677 B2 * | 10/2009 | Stack | 315/127 |
| 2002/0113559 A1 * | 8/2002 | Lam | 315/224 |
| 2002/0114114 A1 * | 8/2002 | Schmitt | 361/18 |

* cited by examiner (Arcing creates high di/dt signals)

(Optically Isolated)

MULTIPLE FAILURE DETECTION SHUTDOWN PROTECTION CIRCUIT FOR AN ELECTRONIC BALLAST

RELATED APPLICATIONS

This patent application is a Continuation Application of a copending U.S. patent application Ser. No. 11/105,091 entitled Improved Multiple Failure Detection Shutdown Protection Circuit for an Electronic Ballast filed Apr. 13, 2005, the entire content of which is incorporated herein by reference. The Ser. No. 11/105,091 application is a Continuation-in-part (CIP) Application of U.S. patent application Ser. No. 10/649,885 entitled Multiple Failure Detection Shutdown Protection Circuit for an Electronic Ballast filed Aug. 26, 2003. Additionally, this patent application is a Continuation-in-part (CIP) application of a copending U.S. patent application Ser. No. 10/649,885 entitled Multiple Failure Detection Shutdown Protection Circuit for an Electronic Ballast filed Aug. 26, 2003, the entire content of which is incorporated herein by reference.

This patent application claims the benefit of priority under 35 USC sections 119 and 120 of both the Ser. No. 11/105,091 application (filed Apr. 13, 2005) and the Ser. No. 10/649,885 application (filed Aug. 26, 2003); Aug. 26, 2003 being the earliest priority date to which this patent application claims the benefit of priority.

BACKGROUND

This invention relates generally to electronic ballasts and, in particular, to improvements relating to shutdown of the lighting circuit with abnormal load conditions, such as short circuit, open circuit, or arcing.

Existing ballast circuits of the type used with fluorescent and, in some cases, neon lamps suffer from certain technical problems. Particularly with respect to single-pin lamps in DC-powered mobile applications, a single interconnection carries both DC input current and AC output current. This causes AC noise and ripple to feed back into the DC power buss distribution system, which, in turn, can affect performance and operation of other systems connected to the DC buss.

FIG. 1 is a diagram of an existing single-pin lamp system. A 24-volt DC supply is connected to a ballast 102 and one side of the lamp 110. Typical of such systems, a safety switch 112 is provided to remove the DC power from the ballast if the lamp is removed. The connections are on either side of the pin, such that when the lamp is removed, the circuit is broken. The other pin 114 of the lamp 110 is connected to the ballast through line 116.

The configuration just described establishes two current paths, including a first current path 120 which includes noisy and high-frequency lamp current, and a second DC ballast input current path 122 which should not include any noise. However, due to the use of the safety switch 112, a single line 130 is common to both the lamp current and DC input current paths. As a result, noise or ripple may be coupled into the DC path, causing AC noise to infiltrate the DC power bus distribution system, leading to performance degradation and failure of other equipment powered by the DC buss, in some cases.

Given that it is not technically straightforward to filter out the conducted electromagnetic interference (EMI) prevalent in existing designs, the need remains for an improved filtering and control circuit configuration.

SUMMARY OF THE INVENTION

This invention resides in a shut-down circuit configured for use with an electronic ballast coupled to a lamp in a control path. In broad and general terms, the circuit includes a device for sensing the electrical energy associated with the load path, and a control circuit for shutting down the ballast in the event that the energy does not conform to a predetermined condition. The sensed energy may be current indicative of lamp installation, short circuit, or removal, or voltage indicative of arcing.

In the preferred embodiment, the device for sensing the electrical energy associated with the load path is an isolation transformer which performs a high pass filter function; however in other embodiments alternative devices such as optical isolators may be employed. The circuitry may further include electronic circuitry to disable the sensing circuit during initial energization of the lamp. In one disclosed example, the sensing circuit includes a node that should be at or near a predetermined electrical potential when the lamp is operating properly, driving a switch such as a Schmitt trigger that turns on or off to shut down the ballast if the node is not at or near the predetermined electrical potential.

In an implementation used to detect voltage fluctuations indicative of arcing, the circuitry may include a second stage high-pass filter or differentiator and detector to detect higher frequency noise. Alternatively, a phase locked loop may be coupled to a low-pass filter to detect high-frequency noise indicative of arcing.

In yet another implementation, a microprocessor performing a digital signal processing algorithm may analyze the energy profile with respect to frequency and make sure that it conforms within a template representative of normal operation.

DETAILED DESCRIPTION OF THE INVENTION

The system of this invention broadly prevents ripple and ballast-generated noise from feeding back into the buss power system of a lamp control circuit. This is broadly carried out by eliminating the common DC path and lamp current hook-up connection to the lamp. This is more particularly carried out by eliminating the safety switching action of the pin and the socket currently typical of single-pin systems.

According to the invention, ballast shut down is performed electronically when the lamp is removed. The circuit of the invention detects the presence of the lamp current to keep the ballast running, but if the lamp is removed or short-circuited, the ballast shuts down to address safety issues. The invention further includes apparatus and methods to detect arcing that occur if a wire becomes loose, foreign material interferes with a good connection, or if a socket becomes defective. In the preferred embodiment, the circuit detects arcing conditions that last longer than a predetermined amount, such as 500 milliseconds, or thereabouts, and shuts down the ballast if arcing is detected for this extended time. Broadly, because the output of the ballast is entirely isolated from the DC input, filtering inside the ballast can now attenuate the noise produced by the ballast to acceptable levels.

Figure 2:
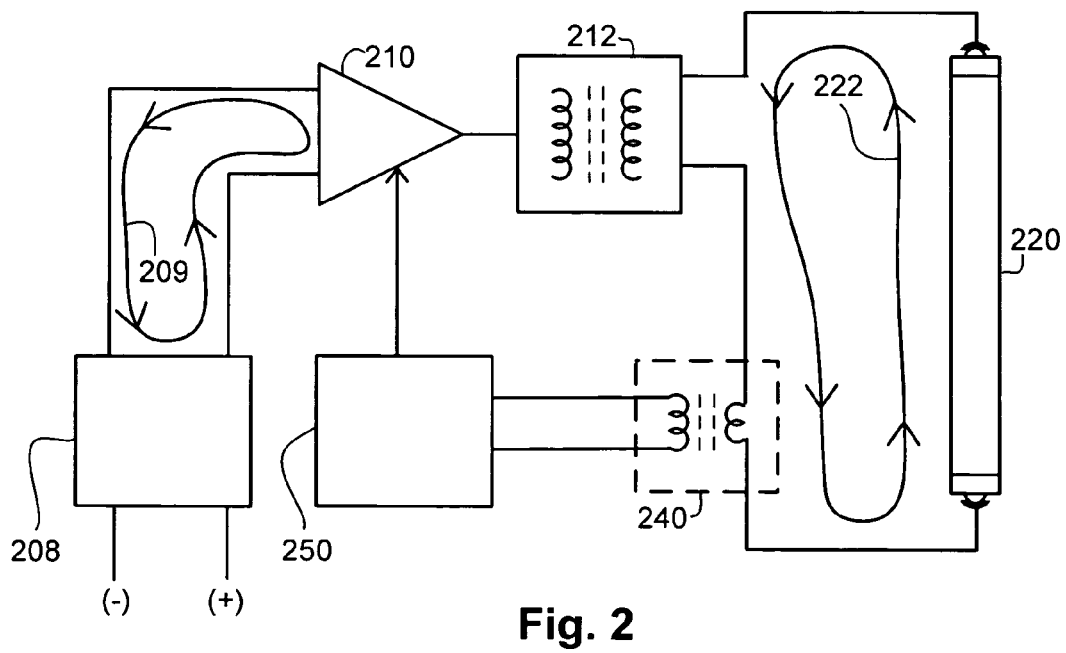
FIG. 2 is a simplified block diagram illustrating important components associated with a preferred embodiment of this invention.

Reference is now made to FIG. 2, which depicts in block-diagram form a circuit configuration according to the invention. 24 VDC is provided to a ballast inverter 210, preferably through a line filter 208. The output of the ballast inverter 210 is fed to an isolation output transformer 212, which forms a lamp current path 214 to operate lamp 220. This configuration allows relatively little noise to couple back into the DC line, because the inverter ripple and noise current 209 are separate from the lamp current path 222.

Figure 1:
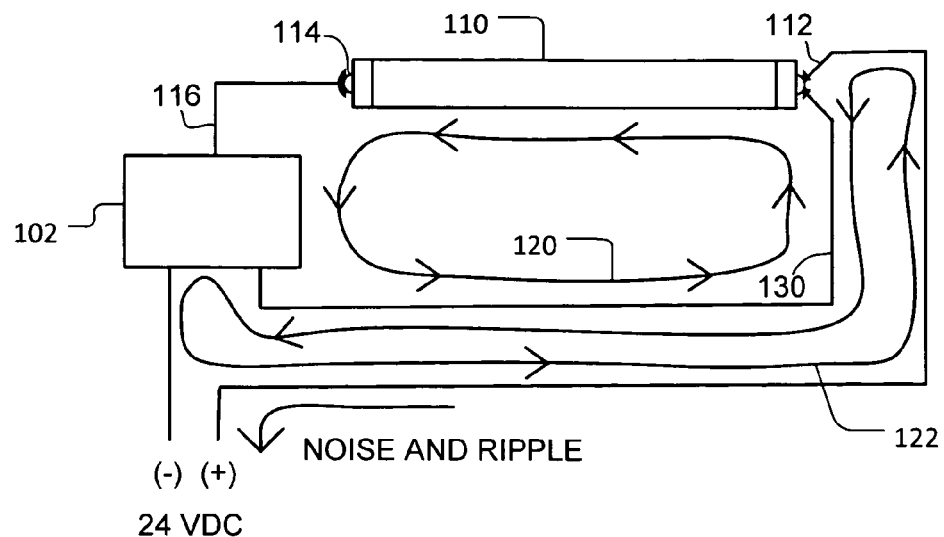
FIG. 1 is a schematic diagram illustrating the problem associated with existing ballast circuits wherein an electrical path is common to both the DC and AC circuits.

The use of a ballast inverter coupled to an isolation output transformer in a fluorescent lamp control circuit is well-known, but previously limited to the mechanical type of a system shutoff described with respect to FIG. 1. Novel to this invention is the use of an architecture featuring a lamp current frequency profile sensing circuit and abnormal condition detection circuit 250 to control the ballast inverter 210. In the preferred embodiment, isolation sense transformer 240 is used to couple a portion of the lamp current to the sensing circuit 250. However, as will be described in further detail below, different types of arc detection may be utilized in accordance with this invention.

Figure 3A:
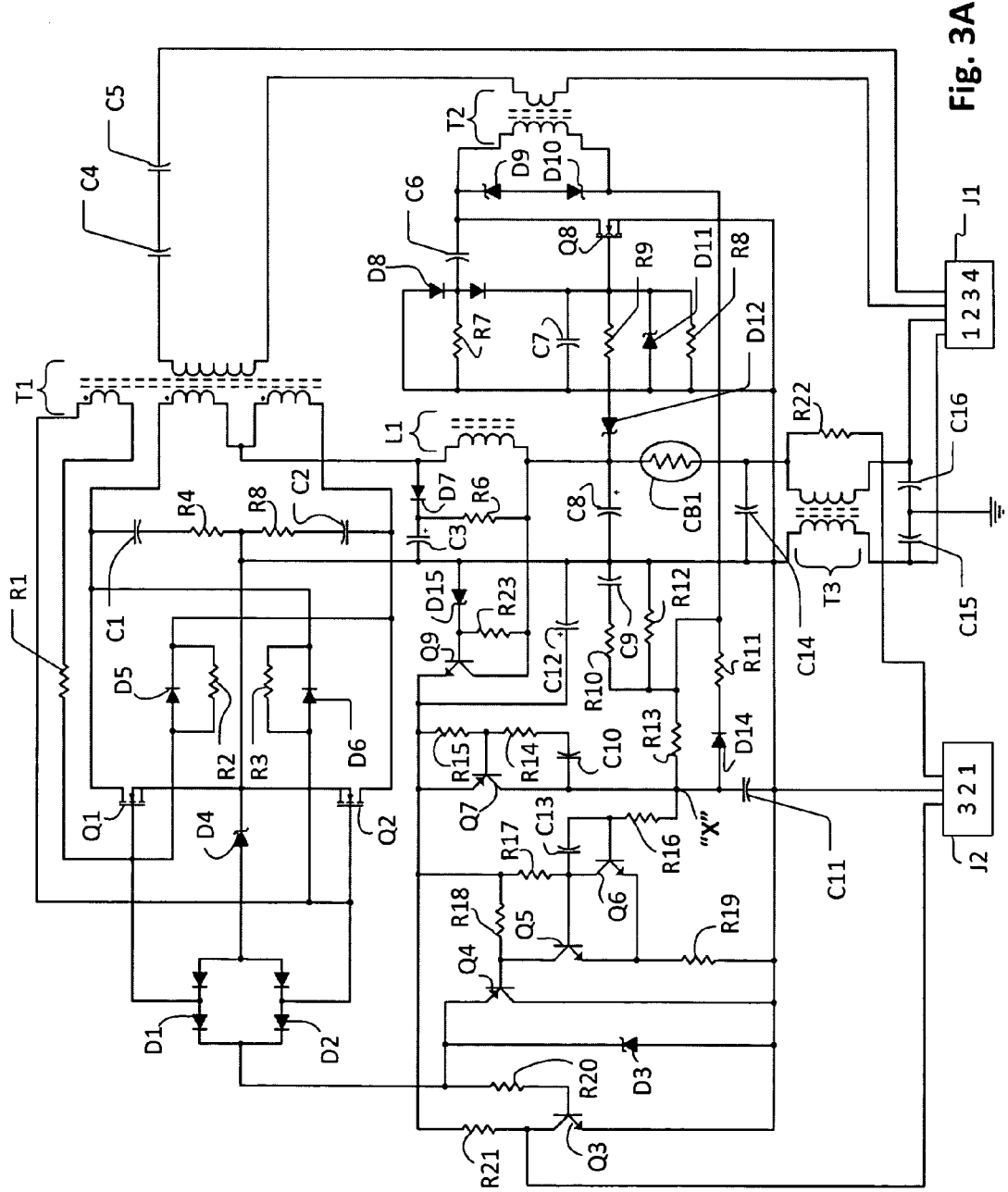
FIG. 3A is a detailed schematic diagram of the preferred embodiment.
Figure 3B:
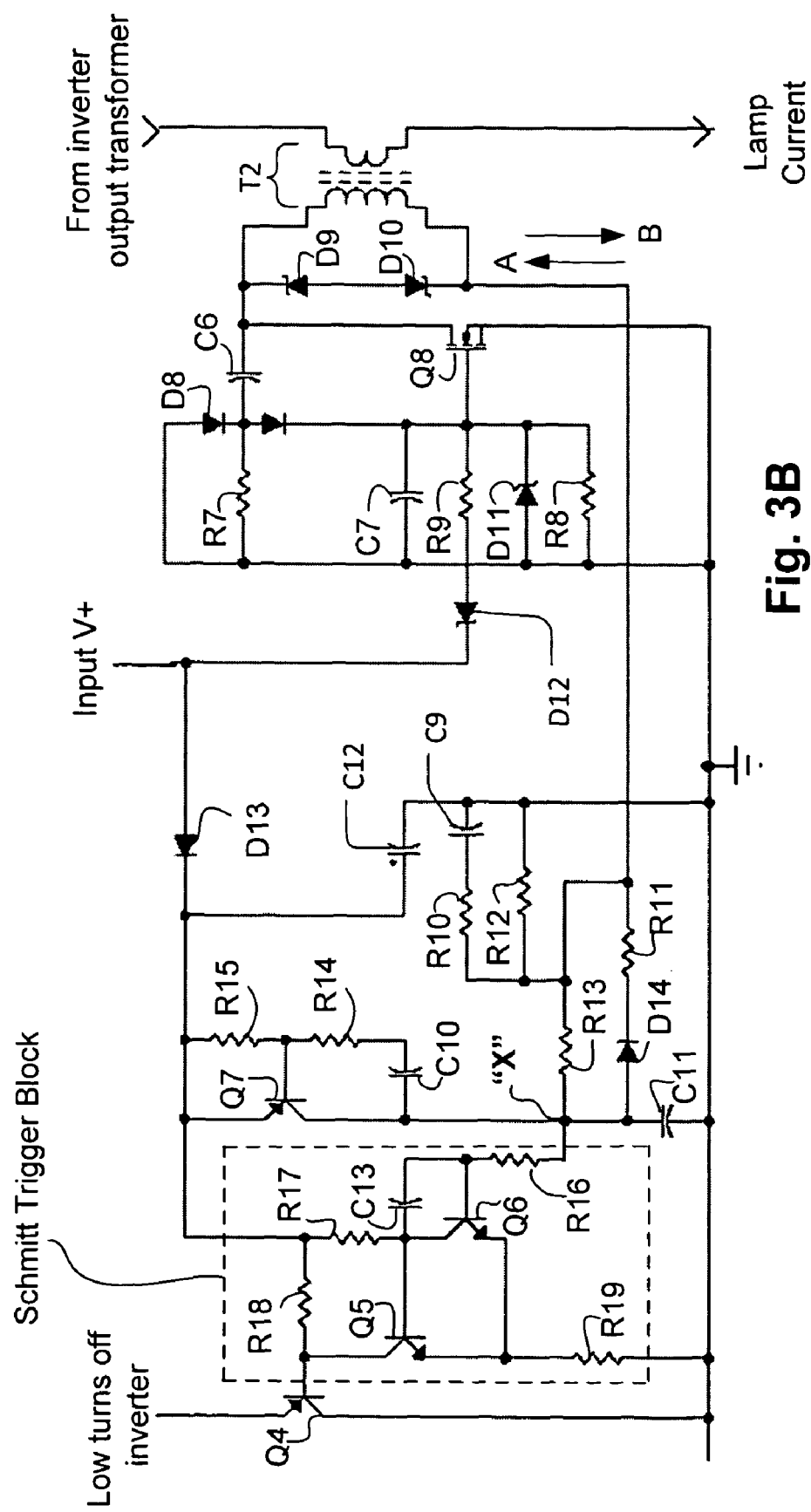
FIG. 3B is a redraw of the detailed schematic diagram to assist with understanding the way in which the circuits function.

Given the simplified block diagram of FIG. 2, the reader's attention is now directed to FIG. 3, which shows an actual schematic for a circuit constructed in accordance with this invention. FIG. 3B is a redraw of the detailed schematic diagram to assist with understanding the way in which the circuits function. In FIG. 3A, T1 is the isolation power output current transformer, T2 is an isolation current sense and voltage step up transformer, and T3 is a line filter. The DC input voltage (24 VDC) gets connected at the plus and minus terminals (pins 1 and 2 of 11 respectively) at the bottom of the drawing.

Q1 and Q2 function as inverters. Although they are preferably implemented using MOSFETs, they may be bipolar transistors or other types of switching devices as appropriate. Inverters Q1 and Q2 are connected in push-pull fashion into the primary winding of transformer T1, that is, the lower windings shown in the diagram having a center tap. L1 is connected to the center tap via a circuit breaker shown lower in the diagram.

The MOSFET inverter control element feedback signal is connected via the upper windings of T1 through R1. An initial turn-on bias is provided by resistors R2 and R3. This configuration is known in the art as a Royer type oscillator. Once oscillation commences, D4 serves to clamp the gate voltages from going too negative. Also, a circuit comprising C1, C2, R3, and R4 reduces the turn on bias coupled to Q1 and Q2 once oscillation begins, by reducing ringing due to parasitic reactance in T1. Diodes D5 and D6 serve to rapidly discharge remaining gate voltage during switch off of each MOSFET. Diode D3 provides positive MOSFET gate protection. Conversely, if the load is short-circuited, the harmonic content in the output of the ballast will be negligible. Because T2 acts to filter out the lamp inverter fundamental frequency, a low output level will occur when harmonic content is low. This has the same effect on the detection circuit as for lamp removal, and the shutdown circuit will activate also.

Oscillation may be terminated by means external to the inverter by turning on Q4, a PNP device which pulls down the voltage at its emitter and shuts off the oscillator circuit when asserted. Q5 and Q6 represent a Schmitt, trigger used to turn on and off Q4 very rapidly, causing it to function as a switch as opposed to a linear amplifier. If operated in a linear region of the load line, the power devices Q1 and Q2 controlled by its output could become overheated.

A point "X" has been labeled in the diagram. When the voltage at this point rises to a level of approximately a volt or more, the Schmitt trigger comprised of Q5 and Q6 turns on which causes Q4 to rapidly shut off. During power initialization to the ballast, however, the control capability of the circuit must be temporarily disabled or overridden to allow the lamp to fire. This is accomplished through the use of capacitor C10 along with R14, R15, and Q7. On initialization, or first turn on, DC is applied to the filter through the circuit breaker device CBI and through the diode D13 which isolates that portion of the circuit which is sensitive to noise, filtered by C12. In particular this isolates the Schmitt trigger and Q4 from false activation.

In other words, the capacitor C10 upon acting temporarily as a short circuit during initialization, causes the rise in supply voltage approach to 24 volts to turn Q7 on, energizing point "X", which then triggers the Schmitt trigger immediately, allowing the ballast to come on. The capacitor then charges through resistors R14 through R16 and R19 via the base-emitter junction of Q6. The interval for disabling the out of tolerance detection circuit during the initial start-up is determined with a time constant set by C10, R14 through R16, and R19. After this window, in case of detection of an abnormal condition, a low voltage at point "X" causes Q6 to turn off, which causes Q5 and Q4 to turn on, which causes the inverter to shut down.

Once the capacitor C10 charges through the resistor series, the lamp current flow detection circuits become enabled. T2 supports abnormal condition detection by its design with the proper choice of core material to provide a stepped-up AC voltage at frequencies above the fundamental lamp operating frequency. The T2 secondary voltage is peak limited by Zener diodes D17 and D18 to prevent damage to the MOSFETs used. Conveniently, the internal parasitic diode of the MOSFET Q8 is utilized as a rectifying device, with one end connected to ground. Because the diode normally goes from source to drain with the cathode being connected to the drain, in this case the diode is pointing up at the diagram, thereby serving as a rectifying device to produce a DC voltage at the secondary output of T2.

R10 provides a current limiting function when the capacitor C9 filters ripple from the Q8 parasitic diode rectifier, so that the current through Q8 does not become excessive.

R12 provides loading for T2, which is operating as a current transformer. Otherwise, the voltage fed into the Schmitt trigger circuit might be excessive, and the value of R12 may be adjusted for optimum output voltage swing as the rectified DC level changes from T2.

R13 in conjunction with C11 provides a time delay filter feature so that the rectified DC voltage level produced by the arc detection circuit does not prematurely cause inverter shut-off. D14 and R11 provide for a discharge time constant smaller than the charging time constant, to allow the detection filter to reset promptly.

However, if the rectified DC running voltage were not applied through R13, C10 would gradually charge and the reduced voltage at point "X" would cause system shut off.

R16 transforms the voltage at point X into a current to be fed into the base of Q6.

Now if the system is operating properly, and there is a load present, the running voltage present at the point "X", will be approximately one and a half to three volts. This value could vary in accordance with component selection tolerances, the lamp used, and other factors. In any case this running voltage will remain relatively consistent as long as a particular lamp is connected. If the lamp is pulled out and removed however, this current would be terminated, and the voltage generated through the internal MOSFET diode discussed above would disappear as well. As the Schmitt trigger input voltage would then drop to zero in a predetermined amount of time, the system will shut down. This aspect of the system provides a safety feature during re-lamping. That is, when the lamp is installed, it will not become operational until the power is turned off and then turned back on again.

Given that the lamp current is already being detected according to this invention, circuits are added to sense arcing and to perform desirable functions if arcing is present. Such arcing is a problem, particularly with single-pin lamps since when the pins are pushed in, they may not seat properly because they are spring loaded. On certain interconnections in the system, a high voltage is connected to the operational current source, such that if a gap does exist it may produce enough voltage to jump the gap and cause problems. In typical systems, which operate at 1,000 volts on start-up, with current on the order of 200 milliamps or thereabouts, this represents a great deal of power which can generate heat and even a fire.

Thus according to the invention, the circuit senses arcing and conveniently uses the transformer T2 for that purpose. In particular the system looks for a characteristic frequency component and amplitude which is produced when arcing occurs across a gap that is larger than one typically encountered when a lamp is operating properly. When the lamp is operating properly, not that much voltage is required to maintain its light output, so that lower voltages are generally acceptable, with a higher voltage being indicative of a problem. Additionally, frequencies higher than the first few harmonics of the fundamental drive frequency are indicative of a problem.

In the preferred embodiment, a first stage filter uses T2 to remove the fundamental, and a second stage high frequency noise and filter function is provided by C6 to perform signal differentiation. C6 along with R7 are connected to dual diodes D8, to form a differentiator and detector, which converts noise to a DC voltage presented to the gate of the MOSFET Q8. To confirm the noise remains present beyond a reasonable time window to cause shutdown, C7 and R9 comprise an integrator that will not build the gate voltage sufficiently until the noise has been present for sufficient duration. Very little charge is required on the gate of the MOSFET to turn the "diode" function into a transistor, which now switches on to conduct in the opposite direction. This conduction overcomes the conduction of the device operating as a diode, and the net voltage across the device either becomes zero or some negative value which causes discharge of C11 through R11 and D14 to occur even more rapidly, thereby reacting relatively quickly to an arcing condition. A slight delay at the onset of arcing is provided, because too fast a trigger might falsely fault a relatively high integrity connection. This 'minimizes false shutdowns.

D11 is a clamp on the gate of the MOSFET so that it does not receive a damagingly high voltage. R8 trickles charge off the gate to allow for reset. When the point "X" is raised, the Schmitt trigger turns on rapidly, turning off Q4, but the system continues to operate. R7 works in cooperation with C6 as a differentiator to make sure that only rapidly changing noise is detected, again, preventing false shutdowns from occurring.

An additional protection means is provided by D12 and R9 which turn the MOSFET Q8 on to bring the control point "X" down and shut down the ballast, when excessive supply voltage is present.

To provide external indication of the state of the ballast functioning, J2 pin 1 may be connected to an LED to show that external power is applied to the ballast, and J2 pin 3 may be connected to an LED to show that the protection circuit has activated.

FIG. 3B is a redrawing of the more complete schematic diagram of FIG. 3A, with component illustration perhaps better suited to understanding the operation of the various functions. Note the arrows labeled A and B. Flow in the direction of A passes through the secondary of transformer T2 and Q8, which functions as a parasitic diode to generate DC voltage to keep the inverter running. T2 current path B through Q8, when the device is turned on, removes the DC voltage from the base of Q6 and thus shuts down the inverter. The device of C6, R7, and D8 (note which is a dual diode package) differentiate and detect high slew-rate currents coupled through T2 during arcing condition to turn on Q8.

Figure 4:
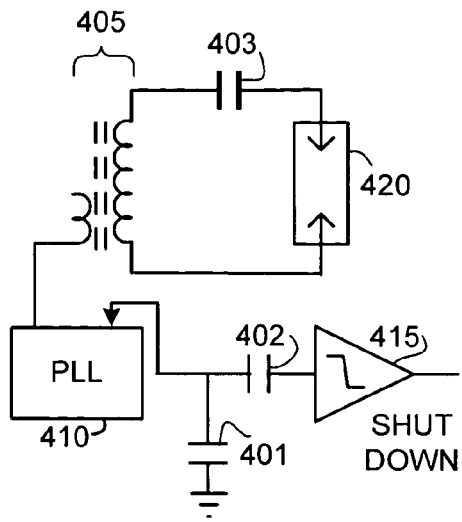
FIG. 4 is an alternative sensing circuit incorporating a phase-locked loop.

As mentioned above, alternative techniques may be used to monitor the lamp current path in accordance with this invention. FIGS. 4-7, and 9 illustrate some of these alternative techniques. In FIG. 4, a transformer is still used as a sensing element, with a Royer-type oscillator. Because without load, referring back to FIG. 3, the output frequency is determined by the series inductor L1 in the primary circuit along with the snubber capacitors C1 and C2, as the load condition changes with arcing, this change in frequency will in turn change the frequency of a phase locked loop, the output voltage of which could be fed into a Schmitt trigger preferably being used once again to activate the shutdown circuit.

Figure 5:
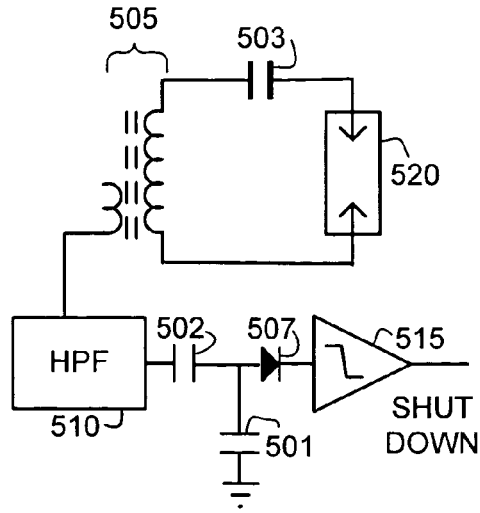
FIG. 5 is a different alternative sensing circuit involving a highpass filter and Schmitt trigger.

In FIG. 5, a transformer is once again used, but a high pass filter (HPF) is used in conjunction with an inverter, which is less sensitive than the circuit of FIG. 4. In general the circuit of FIG. 5 generates higher DC voltage to the Schmitt trigger to bring about shutdown.

Figure 6:
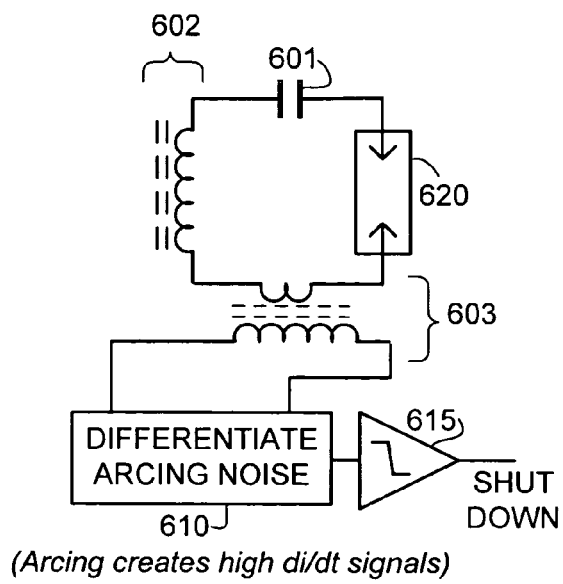
FIG. 6 is yet a further alternative sensing circuit incorporating a module to differentiate arcing noise.

The circuit of FIG. 6 uses a separate isolation transformer that detects a higher change in current with respect to time in conjunction with a differentiator circuit, the output of which is indicative of arcing. Broadly, the circuit responds to a noise component above a certain threshold level such that if such noise is detected, it is concluded to be arcing.

Figure 7:
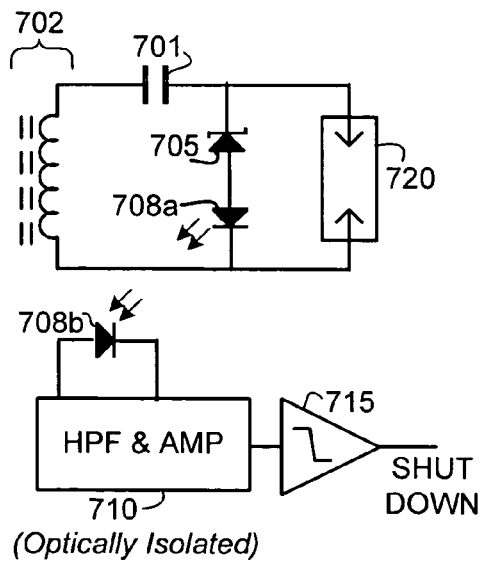
FIG. 7 is yet a different alternative sensing circuit involving an opto isolator and high pass filter.

The circuit of FIG. 7 represents yet a further alternative embodiment utilizing an optical isolator to detect an increase in voltage. Under normal operating conditions, the lamp would otherwise clamp the output circuit voltage, but if there is an arcing condition, this will allow the voltage to rise much higher. A Zener diode is used, the breakdown voltage of which causes the opto-isolator to activate, which in turn generates the shutoff signal.

Figure 8:
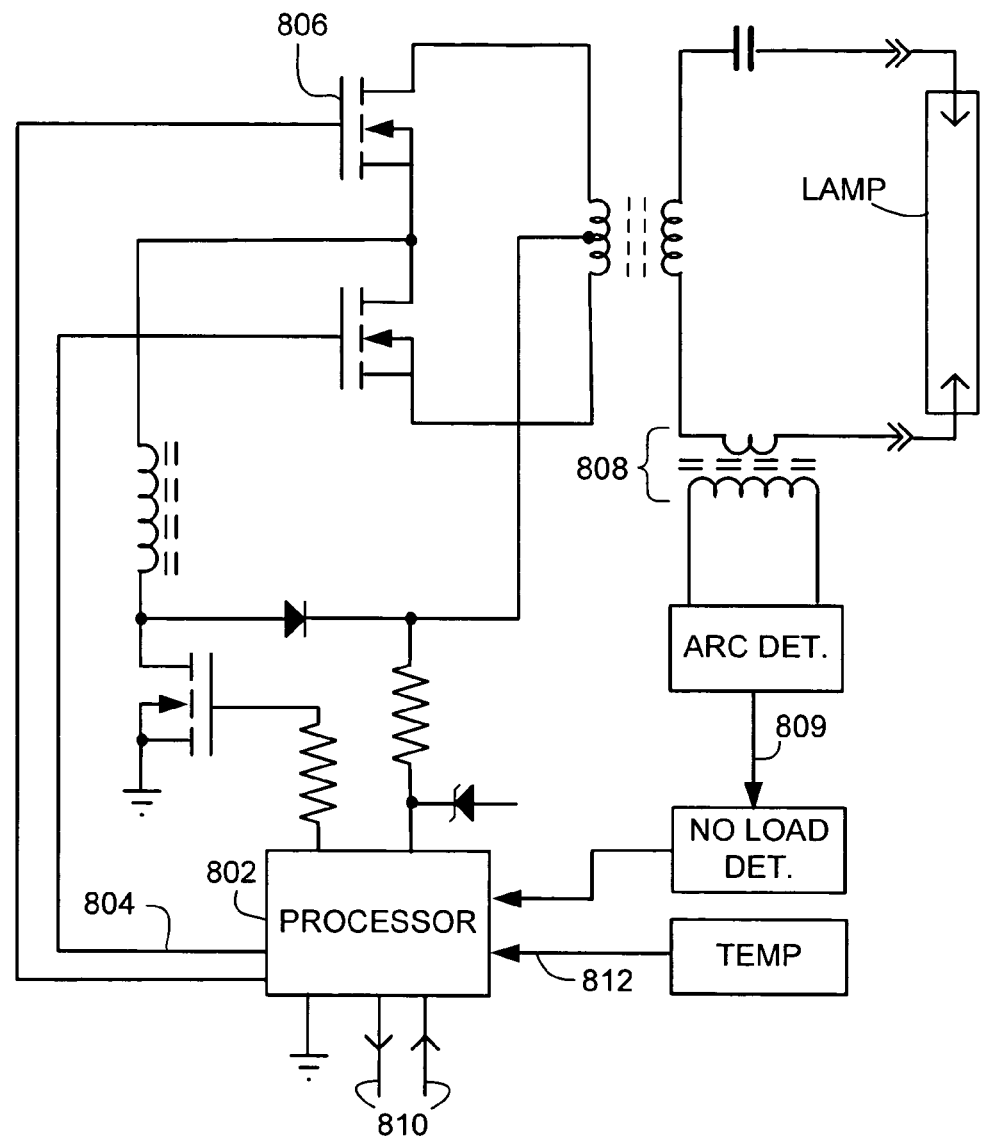
FIG. 8 represents a microprocessor based instrumentation of the invention enabling control and sensing to be communicated over a buss.

FIG. 8 is a drawing which shows an alternative embodiment of the invention, controlled by microprocessor 802, enabling inputs and outputs to be conducted over a bidirectional bus 810. Since the CPU 802 generates the control signals over lines 804 for the MOSFETs 806, it will be appreciated by one of skill in the art of electrical engineering that other functions may be controlled, including a dimming operation.

Figure 9:
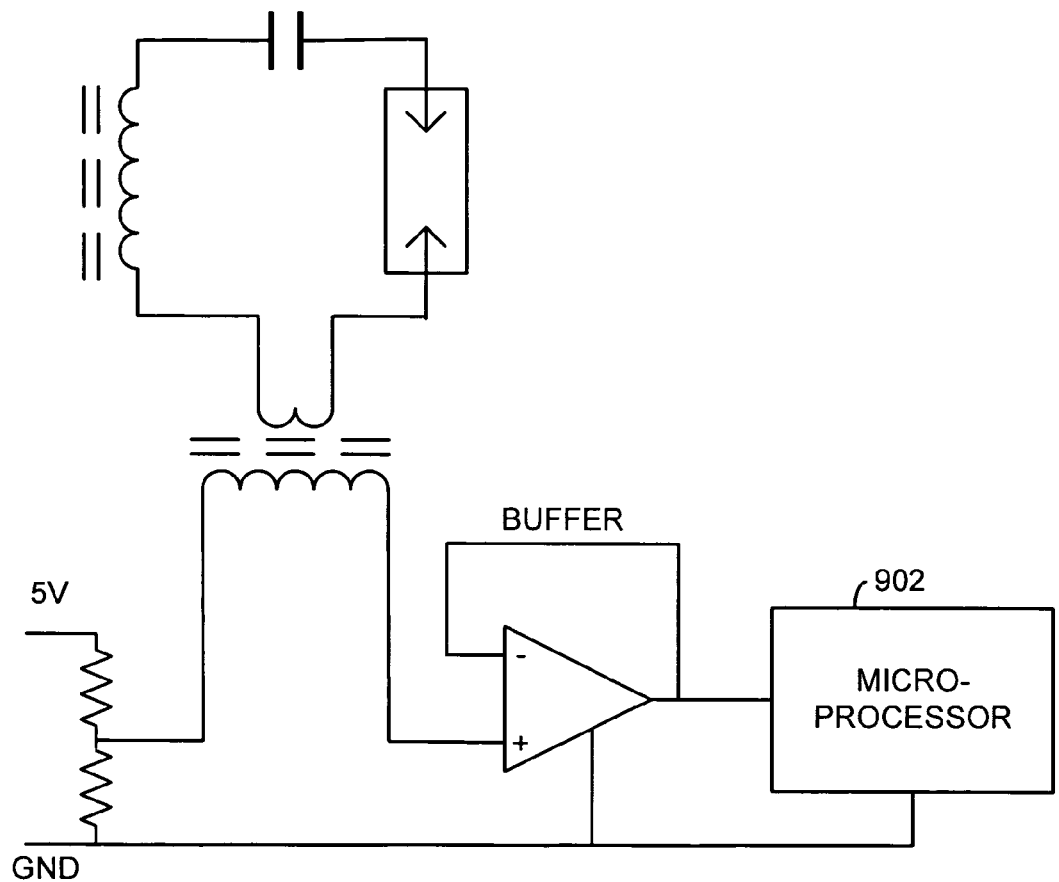
FIG. 9 represents yet a different alternative sensing circuit involving a microprocessor performing a digital signal processing algorithm to identify an undesired lamp load condition.

FIG. 9 is a drawing which shows yet another alternative embodiment of the invention, controlled by microprocessor 902, making use of digital signal processing technology to monitor the frequency characteristics of the lamp drive signal and to cause shutdown when the characteristics are outside of proper tolerance.

Note that although the invention has been described in terms of arc detection with respect to fluorescent tubes, the invention and embodiments described herein on not limited to fluorescent tubes, but may be used with higher voltage systems such as neon signs so long as would be advantageous to sense lamp removal and/or high frequency noise of the type generated by arcing.

What is claimed is:

1. An electrical circuit including a lamp, the electrical circuit comprising:
   a ballast inverter adapted to receive an input electrical power and adapted to provide a relatively controlled electrical current to the lamp;
   an output transformer connected to said ballast inverter adapted to receive the controlled electrical current and to transform the controlled electrical current into alternating current to drive the lamp;
   a lamp current path including said output transformer, the lamp, and an step-up transformer;
   wherein said step-up transformer detects high-frequency noise component on the lamp current path; and
   a sensing circuit connected to said step-up transformer and connected to said ballast inverter, said sensing circuit adapted to receive the detected noise component and adapted to, when an undesired level of noise is sensed, cause said ballast inverter to cease providing the controlled electrical current.

2. The electrical circuit recited in claim 1 wherein the noise component indicates lamp installation or removal.

3. The electrical circuit recited in claim 1 wherein the noise component indicates electrical arcing on the lamp current path.

4. The circuit recited in claim 1 wherein said sensing circuit comprises an optical isolator.

5. The circuit recited in claim 1 further comprising electronic componentry adapted to disable the sensing circuit during initial energization of the lamp.

6. The circuit recited in claim 1 wherein the sensing circuit comprises:
   a node substantially at a predetermined electrical potential when the lamp is operating; and
   a switch coupled to said node adapted to turns on or off to shut down said ballast inverter when said node drafts away from the predetermined electrical potential.

7. The circuit recited in claim 6 wherein said switch comprises a Schmitt trigger.

8. A method of operating an electrical circuit including a lamp, the method comprising:
   receiving input electrical power;
   providing a relatively controlled electrical current to the lamp by processing the input electrical power;
   transforming the controlled electrical current into alternating current to drive the lamp;
   operating the lamp by supplying the alternating current to the lamp;
   detecting high-frequency noise component of the alternating current of the lamp; and
   ceasing the provision of the relatively controlled electrical current to the lamp when the detected noise component is beyond a threshold level.

9. The method recited in claim 8 wherein the noise component indicates lamp installation or removal.

10. The method recited in claim 8 wherein the noise component indicates electrical arcing on the lamp current path.

11. The method recited in claim 8 further comprising a step of disabling the detecting step during initial energization of the lamp.

12. An abnormal load condition detection circuit configured for use with an electronic ballast, the circuit comprising:
   a device for sensing electrical energy associated with a lamp load path;
   a switch element having a switch output that acts as a one-way diode when not actuated, and as a negligible resistance when actuated;
   a coupling circuit to transfer energy from said sensing device element to said switch output, whereby a rectified DC voltage is present at a node when the switch is unactuated and load path electrical energy is present; and
   a high pass filter for actuating the series pass switch element when the harmonic content of the electrical energy is above a predetermined threshold, thus reducing the DC voltage present at the node.

13. The electrical circuit recited in claim 12, wherein the series pass switch element is a field-effect-transistor with an intrinsic diode between source and drain.

14. The electrical circuit recited in claim 12, said detection circuit adapted, when the harmonic content of the electrical energy is above said predetermined threshold, to cause said ballast inverter to cease providing electrical current.

\* \* \* \* \*